United States Patent
Ueno

(10) Patent No.: US 7,636,870 B2
(45) Date of Patent: Dec. 22, 2009

(54) SEMICONDUCTOR INTEGRATED CIRCUIT DEVICE, AND DEBUGGING SYSTEM AND METHOD FOR THE SEMICONDUCTOR INTEGRATED CIRCUIT DEVICE

(75) Inventor: Shigeyuki Ueno, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 440 days.

(21) Appl. No.: 11/586,505

(22) Filed: Oct. 26, 2006

(65) Prior Publication Data
US 2007/0101198 A1 May 3, 2007

(30) Foreign Application Priority Data
Oct. 31, 2005 (JP) ............................. 2005-315826

(51) Int. Cl.
*G06F 11/00* (2006.01)
(52) U.S. Cl. ...................................................... 714/30
(58) Field of Classification Search .................. 714/23, 714/25, 27, 28, 30–35, 39, 45
See application file for complete search history.

(56) References Cited

U.S. PATENT DOCUMENTS

| | | | | |
|---|---|---|---|---|
| 5,761,482 A | * | 6/1998 | Matsui et al. .................. 703/23 |
| 5,848,264 A | * | 12/1998 | Baird et al. .................... 703/28 |
| 6,026,503 A | * | 2/2000 | Gutgold et al. ................ 714/45 |
| 6,075,941 A | * | 6/2000 | Itoh et al. ..................... 717/128 |
| 6,718,294 B1 | * | 4/2004 | Bortfeld ....................... 703/20 |
| 6,751,751 B1 | * | 6/2004 | Murray et al. ................. 714/34 |
| 6,877,113 B2 | * | 4/2005 | Saruwatari et al. ............ 714/34 |
| 7,203,819 B2 | * | 4/2007 | Suzuki et al. ................ 712/227 |
| 2002/0091494 A1 | * | 7/2002 | Kudo ......................... 702/119 |
| 2004/0215857 A1 | * | 10/2004 | Takeuchi et al. ............. 710/113 |
| 2005/0086454 A1 | * | 4/2005 | Morigaki et al. ............. 712/227 |
| 2006/0075310 A1 | * | 4/2006 | Tagawa ....................... 714/45 |

FOREIGN PATENT DOCUMENTS

| JP | 2003-015906 | 1/2003 |
|---|---|---|
| JP | 2004-342001 | 12/2004 |

* cited by examiner

*Primary Examiner*—Nadeem Iqbal
(74) *Attorney, Agent, or Firm*—Young & Thompson

(57) ABSTRACT

To provide a debugging system, debugging method, and a semiconductor integrated circuit device capable of collecting debug-target information with accuracy and improving debug efficiency. A semiconductor integrated circuit device according to an embodiment of the present invention includes: subsystems; a break detecting unit detecting that a program execution of a CPU core in one subsystem satisfies a predetermined break condition; and a break selecting unit stopping operations of one selected from the subsystems in accordance with the detection result of the break detecting unit.

18 Claims, 15 Drawing Sheets

SEMICONDUCTOR INTEGRATED CIRCUIT DEVICE, AND DEBUGGING SYSTEM AND METHOD FOR THE SEMICONDUCTOR INTEGRATED CIRCUIT DEVICE

BACKGROUND OF THE INVENTION

1. Field of the Invention

The present invention relates to a semiconductor integrated circuit device, and a debugging system and method for the semiconductor integrated circuit device. In particular, the invention relates to a semiconductor integrated circuit device including a microprocessor, and a debugging system and method for debugging the same.

2. Description of Related Art

In recent years, semiconductor integrated circuit devices (LSI) show a growing tendency to enhance the speed and performance of a built-in microprocessor. To that end, a semiconductor integrated circuit device of multiprocessor configuration which incorporates plural processors for attaining higher performance beyond the limit of the performance of a single microprocessor has been used.

FIG. 12 shows a configuration example of a general LSI of multiprocessor configuration. As shown in FIG. 12, the LSI 800 includes plural subsystems (subsystems 810a to 810c) and a memory 820. The subsystems 810a to 810c include CPU cores 811a to 811c and peripheral devices 813a to 813c such as DMA (Direct Memory Access) devices. The CPU cores 811a to 811c, the peripheral devices 813a to 813c and the memory 820 are commonly connected with a system bus 830. The system bus 830 is a high-speed bus for transferring data at high speeds with a system clock used as a reference.

The CPU cores 811a to 811c and the peripheral devices 813a to 813c share data in the memory 820 and independently execute processings in parallel to increase a processing speed. For example, the memory 820 stores programs executed in each subsystem, and the CPU cores 811a to 811c download the programs from the memory 820 to execute the programs or write data about the execution result to the memory 820. The peripheral devices 813a to 813c access the memory 820 in response to instructions of the CPU cores 811a to 811c or transfer data between the memory 820 and external units connected with the subsystems 810a to 810c.

Meanwhile, in order to check the operations of an LSI of such multiprocessor configuration, debug is carried out. Examples of the debug includes software debug for executing a program prepared by a user and debugging the program, and hardware debug for executing an inspection program and eliminating malfunctions of a processor. In this specification, the debug includes the software debug and hardware debug.

FIG. 13 shows a configuration example of a conventional debugging system for debugging the LSI of multiprocessor configuration. The conventional debugging system includes an LSI 900 and a debug PC 990. The LSI 900 is connected with the debug PC 990 through a debug I/F (interface) 940.

The debug PC 990 includes a debugger 991 incorporating a debug control program, and the LSI 900 is debugged in response to user's manipulations of the debugger 991.

The LSI 900 is an LSI of multiprocessor configuration, and includes plural subsystems (subsystems 910a to 910c) and a memory 920. The subsystems 910a to 910c include CPU cores 911a to 911c, the DCUs (Debug Control Units) 912a to 912c, and peripheral devices 913a to 913c.

Incidentally, FIG. 13 shows a connection form of bus lines used for debugging, and a connection form of bus lines under normal operations is omitted. That is, although not shown, the CPU cores 911a to 911c, the peripheral devices 913a to 913c and the memory 920 are commonly connected with a system bus similar to the illustrated example of FIG. 12.

As shown in FIG. 13, the LSI 900 is provided with a debugging synchronous bus 931 and a debugging external bus 932 as a bus used for debugging. The debugging synchronous bus 931 is commonly connected with the DCUs 912a to 912c. The debugging external bus 932 is commonly connected with the DCUs 912a to 912c and with the debug I/F 940. The debugging synchronous bus 931 is a high-speed bus like the system bus. The debugging external bus 932 is a low-speed bus that keeps pace with the debug I/F 940.

Such debugging systems enable debugging in plural debug modes. As an example of the debug modes, a "break mode" and an "on-the-fly trace mode" have been generally known. The break mode is such that if a predetermined break point (break condition) is reached during the execution of a program on a CPU, the execution of the program is stopped, and an internal state of the CPU is observed with the manipulations of the debugger. The on-the-fly trace mode is such that a predetermined break point (break condition) is reached during the execution of a program on a CPU, the execution of the program is suspended, and trace data at a predetermined trace point are collected, immediately after which the execution of the program is automatically restarted.

FIG. 14 shows an operation of a conventional debugging system (debugging method) in a break mode. For example, after a user selects the break mode with the debugger 991 of the debug PC 990, the following processing is carried out.

In the break mode, first, the debug PC 990 issues a request to set a break condition to a DCU selected by a user, for example, the DCU 912a through the debugging external bus 932 (S801). As a result, the DCU 912a sets a break condition in the CPU core 911a.

Next, the debug PC 990 sends a request to execute a program to all DCUs, that is, the DCUs 912a to 912c through the debugging external bus 932 (S802). As a result, the DCUs 912a to 912c cause the CPU cores 911a to 911c to start executing a program.

Next, if detecting that the program execution satisfies the break condition, the DCU 912a causes the CPU core 911a to stop executing the program, and sends a notification to that effect to the remaining DCUs, that is, the DCUs 912b and 912c (S803). As a result, the DCUs 912b and 912c cause the CPU cores 911b and 911c to stop executing the program.

Next, the debug PC 990 downloads internal information of the CPU cores 911a to 911c designated by a user, from the DCUs 912a to DCU 912c through the debugging external bus 932 (S804). After the completion of confirming the internal information, the debug PC 990 issues a request to restart executing the program to all DCUs, that is, the DCUs 912a to 912c through the debugging external bus 932 (S805). As a result, the DCUs 912a to 912c cause the CPU cores 911a to 911c to restart executing the program.

FIG. 15 shows an operation of the conventional debugging system (debugging method) in the on-the-fly trace mode. For example, after a user selects the on-the-fly trace mode with the debugger 991 of the debug PC 990, the following processing is performed.

In the on-the-fly trace mode, first, the debug PC 990 issues a request to set a break condition to a DCU selected by a user, for example, the DCU 912a through the debugging external bus 932 (S901). As a result, the DCU 912a sets the break condition in the CPU core 911a.

Next, the debug PC 990 issues a request to set a trace point to a desired DCU, for example, the DCUs 912a to 912c through the debugging external bus 932 (S902). As a result, the DCUs 912a to 912c set trace points in the CPU cores 911a to 911c.

Next, the debug PC 990 issues a request to start executing a program to all DCUs, that is, the DCUs 912a to 912c through the debugging external bus 932 (S903). As a result, the DCUs 912a to 912c cause the CPU cores 911a to 911c to start executing a program.

Next, after detecting that the program execution satisfies the preset break condition, the DCU 912a causes the CPU core 911a to stop executing the program and sends a notification to that effect to the remaining DCUs, that is, the DCU 912b and DCU 912c through the debugging synchronous bus 931 (S904). As a result, the DCUs 912b and 912c cause the CPU cores 913b and 913c to stop executing the program. Then, the DCUs 912a to 912c collect trace data at the preset trace point from the CPU cores 911a to 911c and store the collected data in the DCUs 912a to 912c, and then cause the CPU cores 911a to 911c to restart executing the program (S905)

After that, each time the DCU 912a detects the break point, the operations of notification about the break detection to storage of trace data are repeated (S904' and S905'). Then, the debug PC 990 collects the trace data stored in the DCUs 912a to 913c through the debugging external bus 932 (S906).

However, in the conventional debugging system, in the break mode, the execution of the program on each CPU core is stopped through the debugging synchronous bus, but the peripheral devices of each subsystem are not stopped. For example, when the peripheral device operates in parallel to the CPU core, if the peripheral device is operating even though the CPU core is stopped, an internal condition of the CPU core or a memory is updated, making it difficult to check the internal condition correctly. Further, if a break occurs, all CPU cores connected with the debugging synchronous bus are stopped all the time, and it is impossible to stop only a target CPU core.

Further, in the on-the-fly trace mode, the debugging synchronous bus is a high-speed bus, so the program execution on each CPU core may be immediately stopped to store trace data in the DCU. However, since the debugging external bus is a low-speed bus, it takes much time for the debug PC to collect trace data from the DCU. In general, a memory installed in the DCU for storing trace data is insufficient in memory capacity, and can store only one trace data, and the stored trace data is updated to new trace data soon. Therefore, it is difficult to collect target trace data.

Incidentally, as a conventional technique of debugging the LSI of multiprocessor configuration, a technique as disclosed in Japanese Unexamined Patent Publication Nos. 2004-342001 and 2003-15906 has been known.

As described above, in the conventional debugging system, when the break occurs, only the CPU core is stopped through the debugging synchronous bus, so the internal condition changes in some cases due to the peripheral devices in the subsystem. Further, when the break occurs, all CPU cores connected with the debugging synchronous bus are stopped. Thus, it is impossible to stop only a target CPU core. Further, the debugging synchronous bus commonly connected with the DCUs is a high-speed bus, but the debugging external bus is a low-speed bus that keeps pace with the external I/F. As a result, objective trace data cannot be collected in some cases.

Accordingly, the conventional debugging system has a problem in that debugging cannot be carried out correctly, an error is overlooked, and it takes much time to diagnose the cause of a problem, with the result that debug efficiency is low.

SUMMARY OF THE INVENTION

A semiconductor integrated circuit device according to an aspect of the present invention includes: a plurality of subsystems including processors; a break detecting unit detecting that a program execution of a processor of one of the plurality of subsystems satisfies a predetermined break condition; and a stop control unit stopping operations of a subsystem selected from the plurality of subsystems in accordance with the detection result of the break detecting unit.

According to the semiconductor integrated circuit device, if a program execution of a predetermined processor satisfies a break condition, some of plural subsystems (processors or peripheral devices) can be stopped in sync with each other. Thus, the subsystems can be synchronized in accordance with debug-target information, so the debug-target information can be collected with precision, and a debugging efficiency can be improvised.

A semiconductor integrated circuit device according to another aspect of the invention includes: a processor; a break detecting unit detecting that a program execution of the processor satisfies a predetermined break condition; a trace collecting unit collecting a plurality of trace data at a predetermined trace point from the processor in accordance with the detection result of the break detecting unit; a trace storage unit storing the plurality of collected trace data; and a trace output unit outputting the plurality of stored trace data at a time.

According to the semiconductor integrated circuit device, plural trace data at trace points are stored inside the semiconductor integrated circuit device and then are collectively output. Therefore, the trace data in the semiconductor integrated circuit device is not overwritten, so the debug-target information can be collected with precision, and a debugging efficiency can be improved.

Still another aspect of the invention relates to a debugging system for debugging a semiconductor integrated circuit device including a plurality of processors, the semiconductor integrated circuit including: a break detecting unit detecting that a program execution of a processor of one of the plurality of subsystems satisfies a predetermined break condition; and a stop control unit stopping operations of a subsystem selected from the plurality of subsystems in accordance with the detection result of the break detecting unit.

According to the debugging system, if a program execution of a predetermined processor satisfies a break condition, some of plural subsystems (processors or peripheral devices) can be stopped in sync with each other. Thus, the subsystems can be synchronized in accordance with debug-target information, so the debug-target information can be collected with precision, and a debugging efficiency can be improved.

According to still another aspect of the invention, a debugging method for debugging a semiconductor integrated circuit device including: a plurality of subsystems having processors and a break detecting unit; and a control unit controlling operations of the plurality of subsystems, includes: detecting that a program execution of the plurality of processors satisfies a predetermined break condition with the break detecting unit; and stopping execution of a program on a processor selected from the plurality of processors in accordance with the detection result of the break detecting unit, with the control unit.

According to the debugging method, if a program execution of a predetermined processor satisfies a break condition, some of plural subsystems (processors or peripheral devices) can be stopped in sync with each other. Thus, the subsystems can be synchronized in accordance with debug-target information, so the debug-target information can be collected with precision, and a debugging efficiency can be improved.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

To begin with, a debugging system according to a first embodiment of the present invention is described. A feature of the debugging system of this embodiment is that a system debug control unit in an LSI controls synchronization when the break occurs, and plural trace data in each DCU are stored in the LSI.

Figure 1:
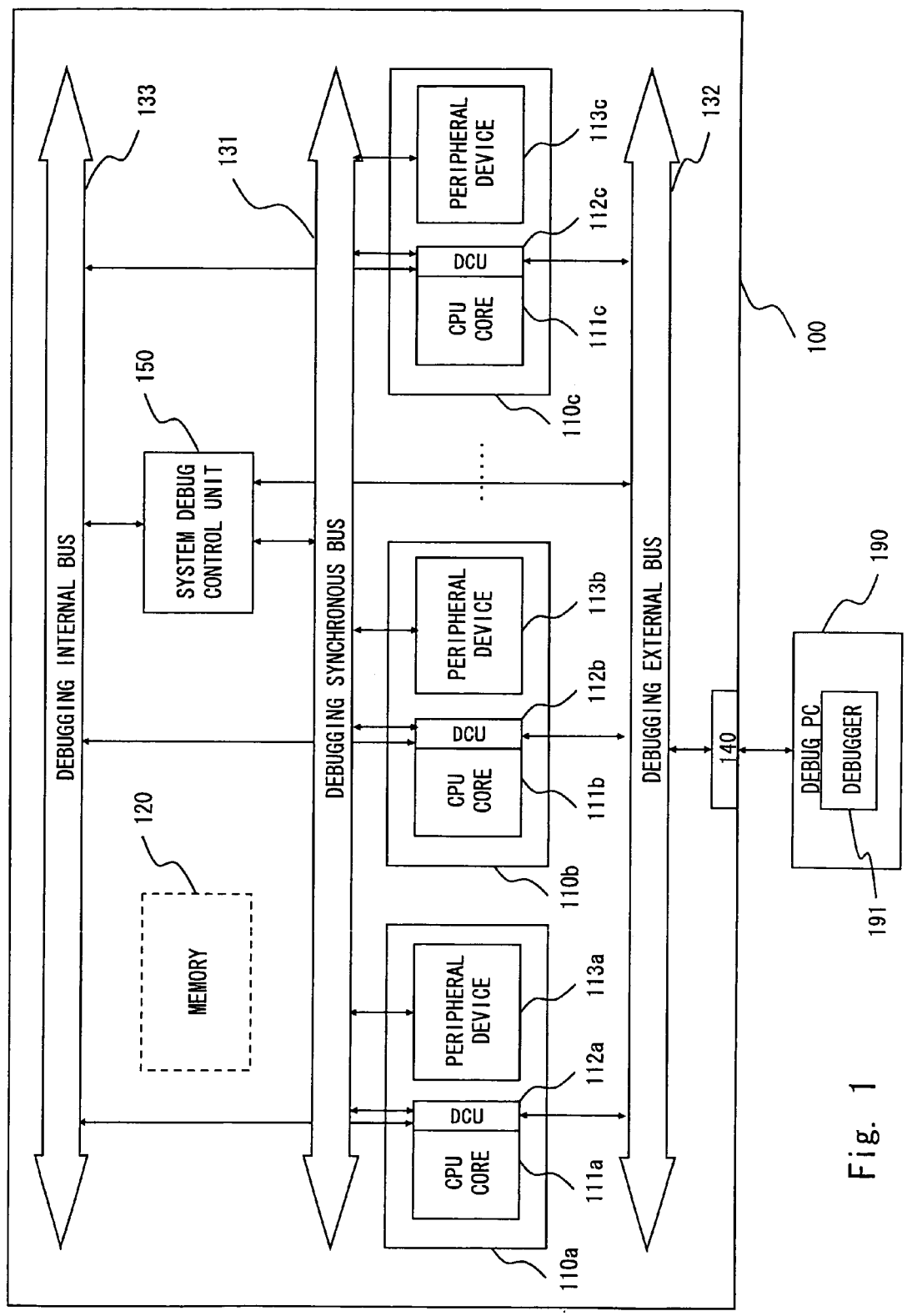
FIG. 1 is a diagram of a debugging system according to the present invention.

Referring now to FIG. 1, the configuration of the debugging system of this embodiment is described. The debugging system is a system for debugging the LSI of multiprocessor configuration, and includes an LSI 100 and a debug PC 190. The LSI 100 and the debug PC 190 are connected through a debug I/F 140. The debug I/F 140 is a debug-only interface, for example, a low-speed serial interface such as a JTAG interface.

The debug PC 190 is made up of, for example, a computer such as a personal computer. The debug PC 190 includes a debugger 191 incorporating a debug control program. The LSI 100 is debugged in response to a user's manipulation on the debugger 191. The debug PC 190 stores programs for the debugger in a memory or the like. If the program is executed on the CPU, functions of the debugger 191 are realized. For example, the debugger 191 sends debugging commands to set a break condition or a trace point and to start execution to the LSI 100 in response to user's manipulations through a user interface such as a mouse.

The LSI 100 is an LSI of multiprocessor configuration, and includes plural subsystem (subsystems 110a to 110c), a memory 120 and a system debug control unit 150. The subsystem 110 itself (one of the subsystems 110a to 110c) has a specific function, and the subsystems can independently operate in parallel. The memory 120 is a memory for storing programs or data necessary for operating each subsystem 110, and is a common memory data of which is shared between the plural subsystems 110. The system debug control unit 150 executes debug control on all the subsystems 110. The system debug control unit 150 executes break control, for example, control of synchronization when the break occurs, or executes trace control, for example, collection of trace data from each subsystem as the debug control.

The subsystems 110a to 110c include CPU cores 111a to 111c and DCUs (Debug Control Units) 112a to 112c, and peripheral devices 113a to 113c. The CPU core 111 (one of CPU cores 111a to 111c) is a program executing unit for reading a program from the memory 120 and executing the read program. The DCU 112 (one of the DCUs 112a to 112c) is a CPU debug control unit for debug control on the CPU core 111 in a target subsystem. The DCU 112 executes break control, for example, setting of a break condition or break detection or executes trace control, for example, setting of a trace point or trace data collection as debug control. The peripheral device 113 (one of the peripheral devices 113a to 113c) is a DMA or cache memory, and is an auxiliary functional part for supporting various operations of the subsystem 110 under the control of the CPU core 111. The peripheral device 113 independently operates in parallel to the CPU core 111 to access a main memory 120 or update internal information of the subsystem 110 or the CPU core 111.

Figure 12:
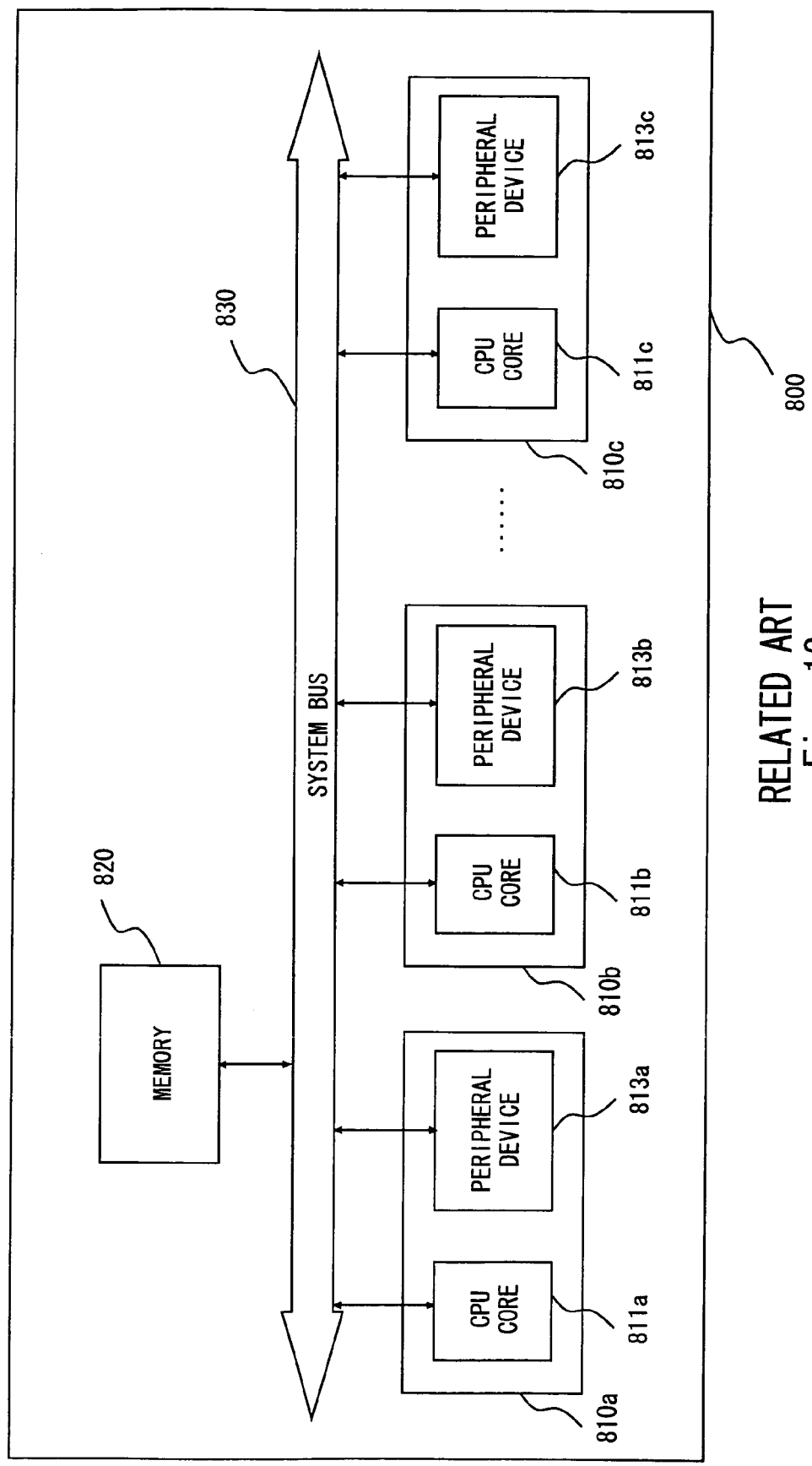
FIG. 12 is a diagram of a general LSI of multiprocessor configuration.

Incidentally, FIG. 1 shows a connection form of bus lines used for debugging, and a connection form of the bus lines under normal operations is omitted. That is, although not shown, the CPU cores 111a to 111c, the peripheral devices 113a to 113c and the memory 120 are commonly connected with the system bus similar to an illustrated example of FIG. 12.

As shown in FIG. 1, the LSI 100 is provided with a debugging synchronous bus 131, a debugging external bus 132 and a debugging internal bus 133 as a bus used for debugging.

The debugging synchronous bus 131 is commonly connected with the DCUs 112a to 112c, the peripheral devices 113a to 113c, and the system debug control unit 150. The debugging synchronous bus 131 is a bus transferring a synchronous signal for synchronization for stopping operations in each subsystem 110 when the break occurs and for restarting the operations after the operations are stopped. The debugging synchronous bus 131 is a high-speed bus like the system bus.

The debugging external bus 132 is commonly connected with the DCUs 112a to 112c and the system debug control unit 150, and with the debug I/F 140. The debugging external bus 132 is a bus for transferring a debug control command or trace data between the debug PC 190 and the DCU 112 or the system debug control unit 150 through the debug I/F 140. The debugging external bus 132 is a low-speed bus that keeps pace with the debug I/F 140.

The debugging internal bus 133 is commonly connected with the DCUs 112*a* to 112*c*, and the system debug control unit 150. The debugging internal bus 133 is a bus for transferring trace data of each DCU 112 to the system debug control unit 150. The debugging internal bus 133 is a high-speed bus to collect trace data from the DCU 112 as early as possible, for example, like the system bus.

Figure 2:
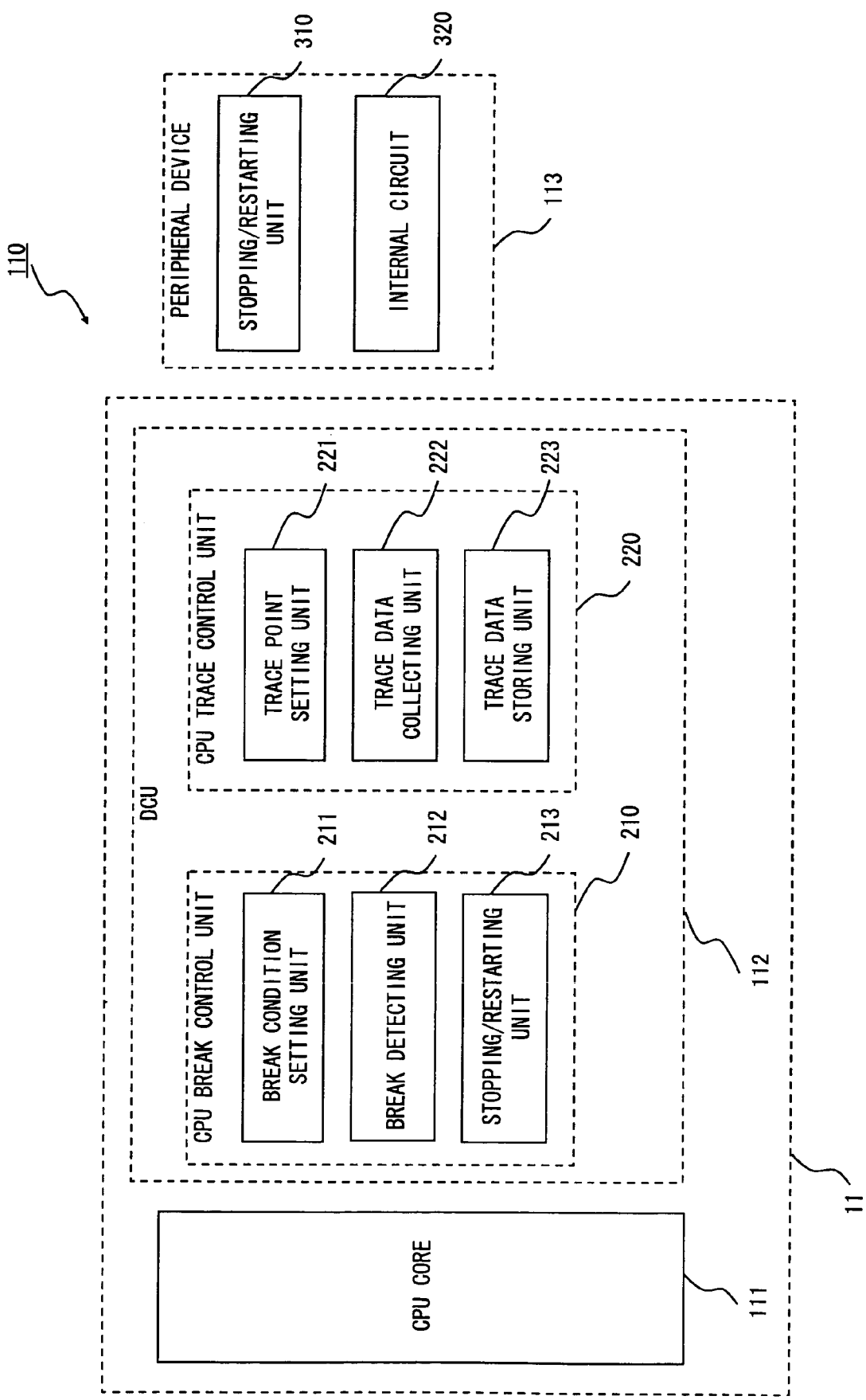
FIG. 2 is a block diagram showing the configuration of a subsystem according to the present invention.

Referring next to FIG. 2, the configuration of the subsystem of this embodiment is described. The subsystem 110 includes the CPU core 111, the DCU 112, and the peripheral device 113 as described above. The CPU core 111 and the DCU 112 constitute a processor 11. That is, the subsystem 110 is composed of the processor 11 and the peripheral device 113.

As shown in FIG. 2, the DCU 112 includes a CPU break control unit 211, and a CPU trace control unit.

The CPU break control unit 211 executes break control of one CPU core 111 if the debug mode is a break mode or on-the-fly trace mode. The CPU break control unit 211 includes a break condition setting unit 211, a break detecting unit 212, and a suspending/restarting unit 213.

In response to a request from the debug PC 190, the break condition setting unit 211 sets a break condition in the CPU core 111. The break condition is to suspend execution of a program on the CPU core 111 and switch a normal state (such a state that the CPU core 111 executes a program) to a break state (such a state that the debug PC 190 can check internal information of the CPU core 111) or a trace state (such a state that the DCU 112 collects trace data of the CPU core 111). For example, the break condition means a condition that a specific program instruction is carried out, or an access is made to a specific address of the memory 120.

The break detecting unit 212 detects that the program execution of the CPU core 111 satisfies a preset break condition, that is, a break occurs in the CPU core 111. The break detecting unit 212 then notifies the system debug control unit 150 that the break is detected.

In response to a request from the system debug control unit 150, the suspending/restarting unit 213 executes control to stop or restart the execution of a program on the CPU core 111. That is, the suspending/restarting unit 213 switches an operational state of the CPU core 111 from a normal state to the break state or trace state, or from the break state or trace state to the normal state.

The CPU trace control unit 220 executes trace control of one CPU core 111 if the debug mode is the on-the-fly trace mode. The CPU trace control unit 220 includes a trace point setting unit 221, a trace data collecting unit 222, and a trace data holding unit 223.

In response to a request from the debug PC 190, the trace point setting unit 221 sets a trace point in the CPU core 111. The trace point indicates data to be collected as trace data. For example, a trace point is an address of a specific register in the subsystem 110 or a specific address of the main memory 120.

The trace data collecting unit 222 collects data at the preset trace point at the time of detecting a break (switching to a trace state, as trace data. The trace data holding unit 223 temporarily stores the collected trace data. For example, the trace data holding unit 223 can store one trace data.

As shown in FIG. 2, the peripheral device 113 includes a suspending/restarting unit 310 and an internal circuit 320.

The internal circuit 320 is to execute functions of the peripheral device 113. The suspending/restarting unit 310 executes control to stop or restart operations of the internal circuit 320 in response to a request from the system debug control unit 150. That is, the suspending/restarting unit 310 switches an operational state of the internal circuit 320 from the normal state to the break state or trace state or from the break state or trace state to the normal state.

Figure 3A:
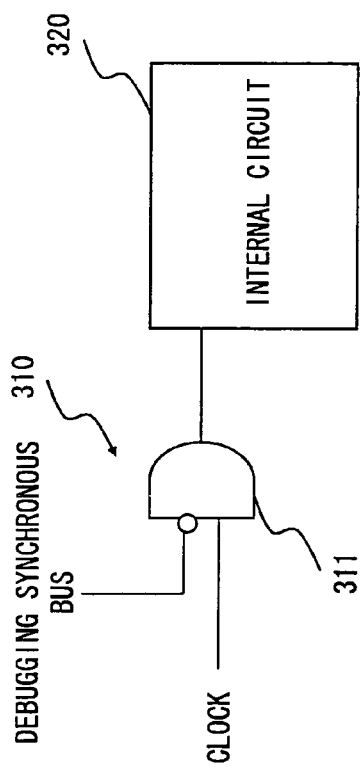
FIG. 3A is a circuit diagram showing a configuration example of a peripheral device according to the present invention.
Figure 3B:
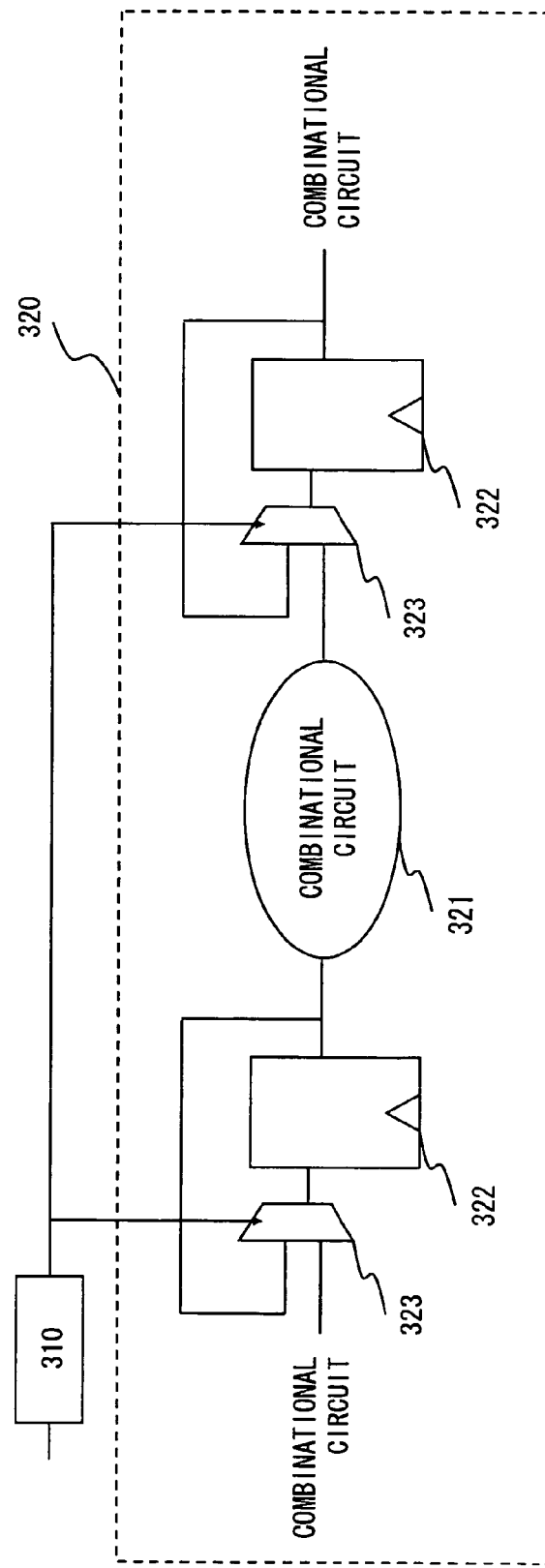
FIG. 3B is a circuit diagram showing a configuration example of a peripheral device according to the present invention.

FIGS. 3A and 3B show a specific circuit example of the peripheral device 113. FIG. 3A shows an example of controlling an operational clock of the internal circuit 320 as the suspending/restarting unit 310. The suspending/restarting unit 310 includes an AND circuit 311. The AND circuit 311 receives an inverted signal of a synchronous signal of the debugging synchronous bus 131 and a clock signal as an operational clock of the internal circuit 320.

For example, if a synchronous signal of the debugging synchronous bus 131 is a low-level one, that is, in an asynchronous state (stop/restart), the AND circuit 311 transmits the clock signal directly to the internal circuit 320, and the internal circuit 320 operates in accordance with the clock signal. Further, if the synchronous signal is a high-level one, that is, in a synchronous state (stop), the AND circuit 311 stops transmitting the clock signal to the internal circuit 320, and the internal circuit 320 stops operations.

FIG. 3B shows an example of controlling a selector of an F/F of the internal circuit 320 as the suspending/restarting unit 310. For example, the internal circuit 320 includes plural combinational circuits 321, and F/Fs 322 for latching an input signal and an output signal are provided on the upstream and downstream sides of the combinational circuit 321. A selector 323 is connected with an input of each F/F 322. The selector 323 receives an output signal from the F/F 322 and an output signal from the combinational circuit at the previous stage to select one of the two output signals in accordance with a selection signal to input the selected signal to the F/F 322. The suspending/restarting unit 310 outputs a synchronous signal of the debugging synchronous bus 131 as a selection signal of the selector 323.

For example, if the synchronous signal of the debugging synchronous bus 131 (selection signal) is a low-level one, that is, in an asynchronous state (stop/restart), the selector 323 supplies the output signal from the combinational circuit at the previous stage to the F/F 322. As a result, the F/F 322 latches the output signal of the previous combinational circuit to input the latched signal to the combinational circuit 321, and the combinational circuit 321 operates in accordance with the input signal. Further, if the synchronous signal (selection signal) is a high-level one, that is, in a synchronous state (stop), the selector 323 sends the output signal of the F/F 322, not the output signal of the previous combinational circuit, to the F/F 322. As a result, the F/F 322 does not input the output signal of the previous combinational circuit to the combinational circuit 321, and the combinational circuit 321 stops operations.

Figure 4:
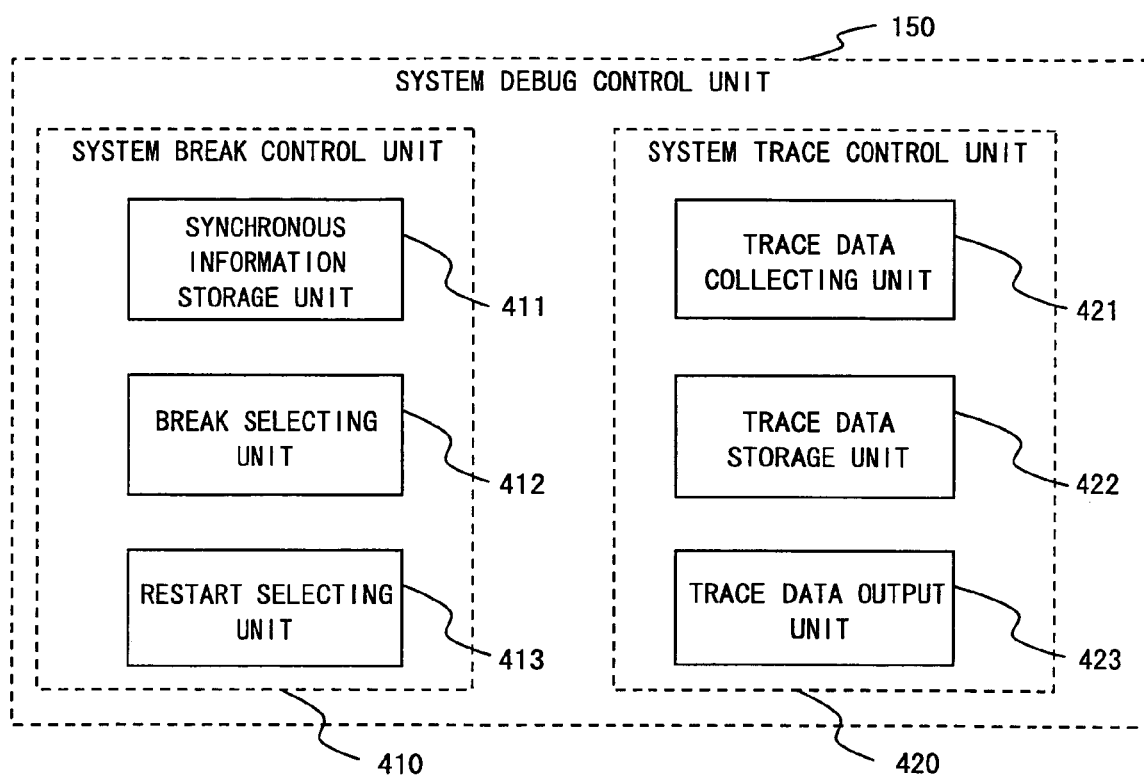
FIG. 4 is a block diagram showing the configuration of a system debug control unit according to the present invention.

Referring next to FIG. 4, the system debug control unit 150 of this embodiment is described. As shown in FIG. 4, the system debug control unit 150 includes a system break control unit 410 and a system trace control unit 420.

If the debug mode is the break mode or the on-the-fly trace mode, the system break control unit 410 executes break control on all the CPU cores 111. The system break control unit 410 includes a synchronization information storage unit 411, a break selecting unit 412, and a restart selecting unit 413.

In response to a request from the debug PC 190, the synchronization information storage unit 411 stores synchronization information representing the subsystem 110 to be synchronized (CPU core 111 or peripheral device 113) when the break occurs or the operation is restarted. When receiving a notification about a break from the DCU 112, that is, when a break occurs, the break selecting unit 412 selects the subsystems 110 to be stopped in sync with each other (CPU cores 111 or the peripheral devices 113) based on the synchronization information in the synchronization information storage unit 411. That is, the break selecting unit 412 is a stop control unit stopping the operations of the subsystem 110 selected in accordance with the information in the synchronization information storage unit 411, in response to the detection of a break with the break detecting unit 212 of the DCU 112. That is, the break selecting unit 412 synchronizes timings of switching the operational state of the subsystems 110 from the normal state to the break state or trace state.

Upon the restart following the break occurrence, the restart selecting unit 413 selects the subsystems 110 to restart operations in sync with each other (CPU cores 111 or the peripheral devices 113) in accordance with a request from the debug PC 130 and the synchronization information in the synchronization information storage unit 411. In other words, the restart selecting unit 413 is a restart control unit for restarting operations of the subsystem 110 selected in accordance with the information of the synchronization information storage unit 411 after the break selecting unit 412 stops the operations of the subsystem 110, in response to a request from the debug PC 130. That is, the restart selecting unit 413 synchronizes timings of switching the operational state of the subsystems 110 from the break state to the normal state.

If the debug mode is the on-the-fly trace mode, the system trace control unit 420 executes trace control on all the CPU cores 111. The system trace control unit 420 includes a trace data collecting unit 421, a trace data storage unit 422 and a trace data output unit 423.

The trace data collecting unit 421 collects trace data stored in each DCU 112 when a break occurs. That is, the trace data collecting unit 421 collects plural trace data from the DCU 112 of the subsystem 110 which is stopped and switched to the trace state, after the break selecting unit 412 stops the operations of the subsystem 110.

The trace data storage unit 422 stores the plural trace data collected by the trace data collecting unit 421. The trace data storage unit 422 has a memory capacity enough to hold trace data without overwriting data until the debug PC 190 completes the retrieval of the trace data. The trace data storage unit 422 may be a memory provided inside the system debug control unit 150, or the memory 120 provided outside the system debug control unit 150. The trace data output unit 423 collectively outputs the plural trace data stored in the trace data storage unit 423 to the debug PC 190 at a time.

Figure 5:
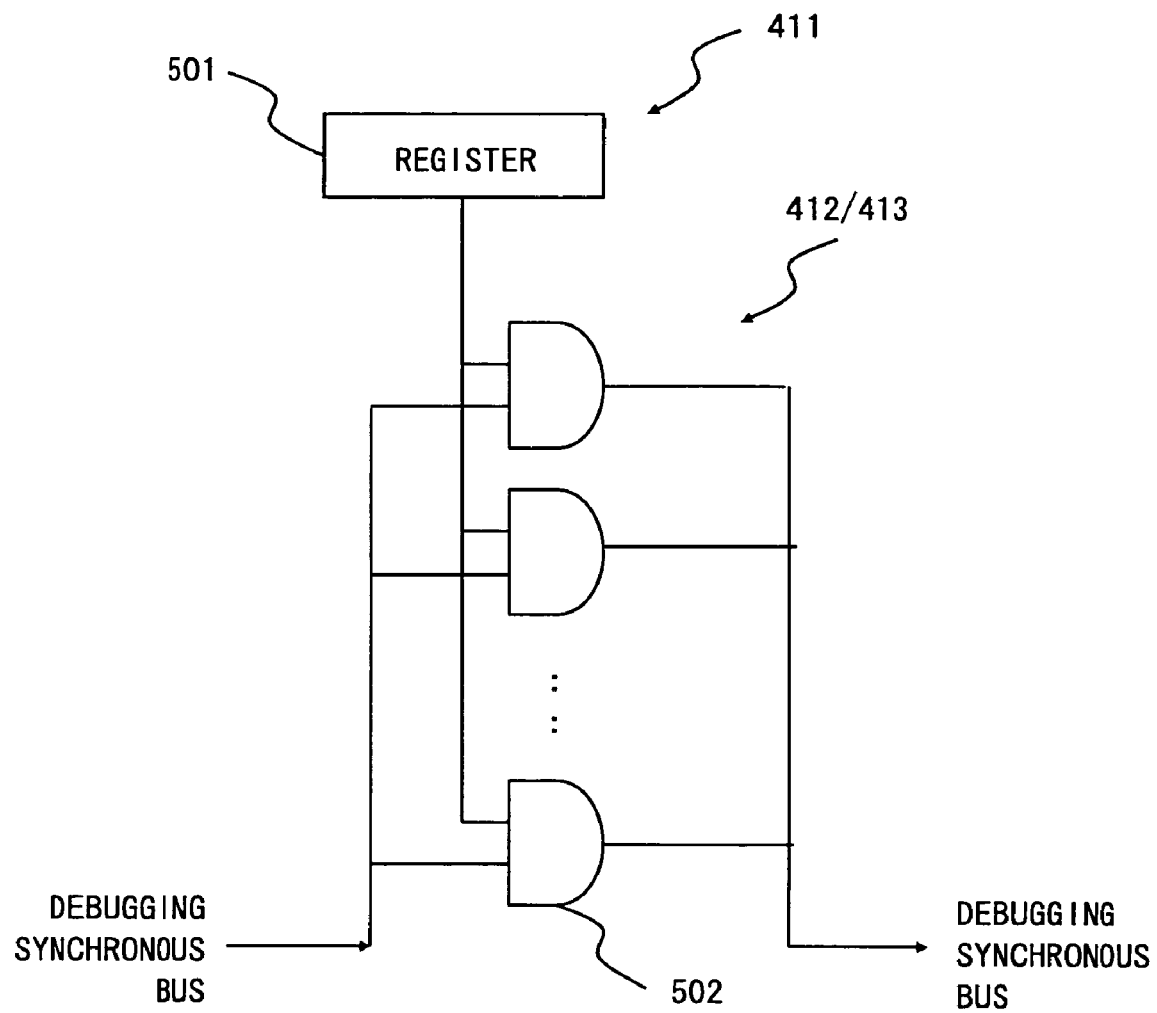
FIG. 5 is a circuit diagram showing a configuration example of a system debug control unit according to the present invention.

FIG. 5 shows a specific circuit example of the break control unit 410. For example, the synchronization information storage unit 411 is composed of a register 501, and the break selecting unit 412 is composed of plural AND circuits 502.

The register 501 can register plural bit information, each of which corresponds to the subsystem 110 (DCU 112 or the peripheral device 113). When the break occurs, the debug PC 190 sets a high bit level in the subsystems 110 to be stopped in sync with each other. The AND circuit 502 is provided for each bit information in the register 501, that is, the subsystem 110 (DCU 112 or the peripheral device 113), and the AND circuit 502 receives the bit information in the register 501 and a synchronous signal of the debugging synchronous bus.

For example, when the DCU 112 inputs a high-level signal as the synchronous signal of the debugging synchronous bus 131, the register 501 sends the high-level signal to the preset AND circuit 502, and the synchronous signal is input to corresponding subsystems 110 (DCUs 112 or the peripheral devices 113).

The restart selecting unit 413 is also composed of plural AND circuits 502, and a high bit level for a bit level of the subsystems 110 to restart operations in sync with each other is set in the register 501. For example, when a request to restart operations is issued from the debug PC 190, the register 501 outputs a high-level signal from the preset AND circuit 502, and a synchronous signal is input to corresponding subsystems 110 (DCUs 112 or the peripheral devices 113).

Figure 6:
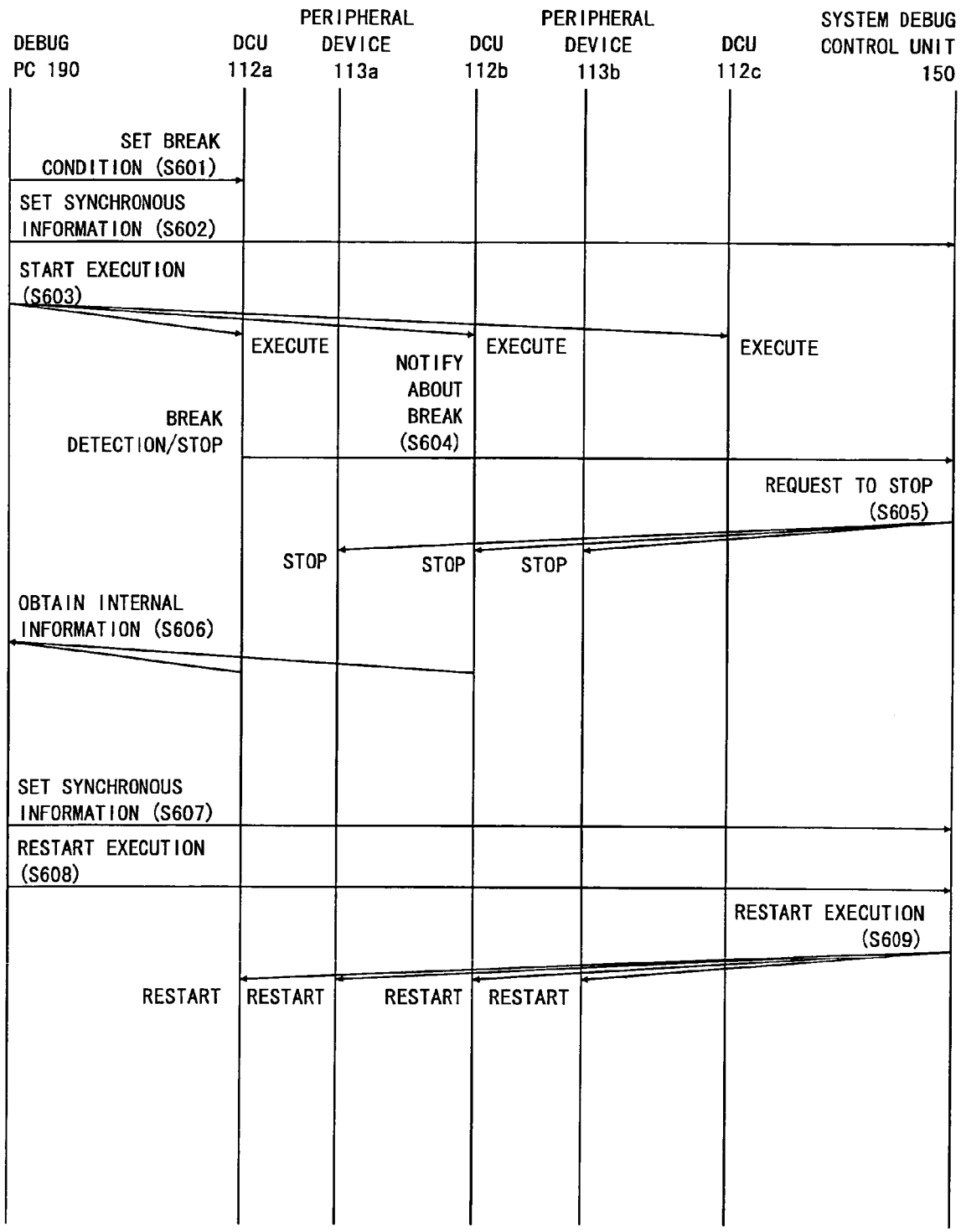
FIG. 6 is a sequence chart of operations of the debugging system according to the present invention.

Referring next to FIGS. 6 to 9, operations of the debugging system of this embodiment (debugging method) are described. FIG. 6 shows operations of the debugging system in the break mode. For example, after a user selects the break mode with the debugger 191 of the debug PC 190, the following processing is carried out.

In the break mode, the debug PC 190 first issues a request to set a break condition to the DCU selected by a user, for example, the DCU 112a through the debugging external bus 132 (S601). As a result, the break condition setting unit 211 of the DCU 112a sets a break condition in the CPU core 111a in response to the request.

Next, the debug PC 190 sets break synchronization information about subsystems to be stopped in sync with each other when a break occurs, in the system debug control unit 150 through the debugging external bus 132 (S602). That is, synchronization information is stored in the synchronization information storage unit 411 of the system debug control unit 150. For example, the information is set to synchronize the peripheral device 113a, the DCU 112b, and the peripheral device 113b.

Next, the debug PC 190 issues a request to start executing a program to all DCUs, that is, the DCUs 112a to 112c through the debugging external bus 132 (S603). As a result, the DCUs 112a to 112c cause the CPU cores 111a to 111c to start executing a program.

Next, the break detecting unit 212 of the DCU 112a causes the CPU core 111a to stop executing the program (switch to the break state) after detecting that the program execution satisfies the preset break condition, and then notifies the system debug control unit 150 that the break occurs through the debugging synchronous bus 131 (S604).

Next, the system debug control unit 150 sends a request to stop execution to subsystems to be stopped in sync with each other based on the preset break synchronization information through the debugging synchronous bus 131 (S605). In this example, in S602, the information is set such that the peripheral device 113a, the DCU 112b, and the peripheral device 113b are synchronized, so the DCU 112c does not need to stop execution, and a request to stop execution is issued to the peripheral device 113a, the DCU 112b, and the peripheral device 113b. That is, when receiving a notification that the break occurs, the break selecting unit 412 of the system debug control unit 150 references synchronization information in the synchronization information storage unit 411 to set a high level for a synchronous signal of the debugging synchronous bus 131 corresponding to the DCU 112 and peripheral device 113 to be stopped. As a result, the suspending/restarting unit 213 of the DCU 112b causes the CPU core 111b to stop executing the program (switch to the break state) in accordance with the synchronous signal. The suspending/restarting unit 310 of the peripheral devices 113a and 113b also stop circuit operations in accordance with the synchronous signal (switch to the break state).

Next, the debug PC 190 retrieves internal information of the CPU cores 111*a* and 111*b* requested by a user from the stopped DCUs 112*a* and 112*b* through the debugging external bus 132 (S606)

Next, after the completion of checking the internal information, the debug PC 190 sets restart synchronization information about subsystems to restart execution in sync with each other in the system debug control unit 150 through the debugging external bus 132 (S607). That is, the synchronization information storage unit 411 of the system debug control unit 150 stores synchronization information. For example, the information is set such that the DCU 112*a*, the peripheral device 113*a*, the DCU 112, and the peripheral device 113*b* are synchronized.

Next, the debug PC 190 sends a request to restart execution to the system debug control unit 150 through the debugging external bus 132 (S608). As a result, the system debug control unit 150 sends a request to restart execution to the subsystems, (in this example, the DCU 112*a*, the peripheral device 113*a*, the DCU 112, and the peripheral device 113*b* to restart operations in sync with each other based on settings of the restart synchronization information, (S609). That is, in response to the request to restart execution, the restart selecting unit 413 of the system debug control unit 150 references the synchronization information in the synchronization information storage unit 411 to set a low level for a synchronous signal of the debugging synchronous bus 131 corresponding to the DCU 112 and the peripheral device 113 to restart execution. As a result, the suspending/restarting unit 213 of the DCUs 112*a* and 112*b* causes the CPU core 111*b* to restart executing the program in accordance with the synchronous signal (switch to the normal state). The suspending/restarting unit 310 of the peripheral devices 113*a* and 113*b* also restarts circuit operations in accordance with the synchronous signal (switches to the normal state).

Figure 7:
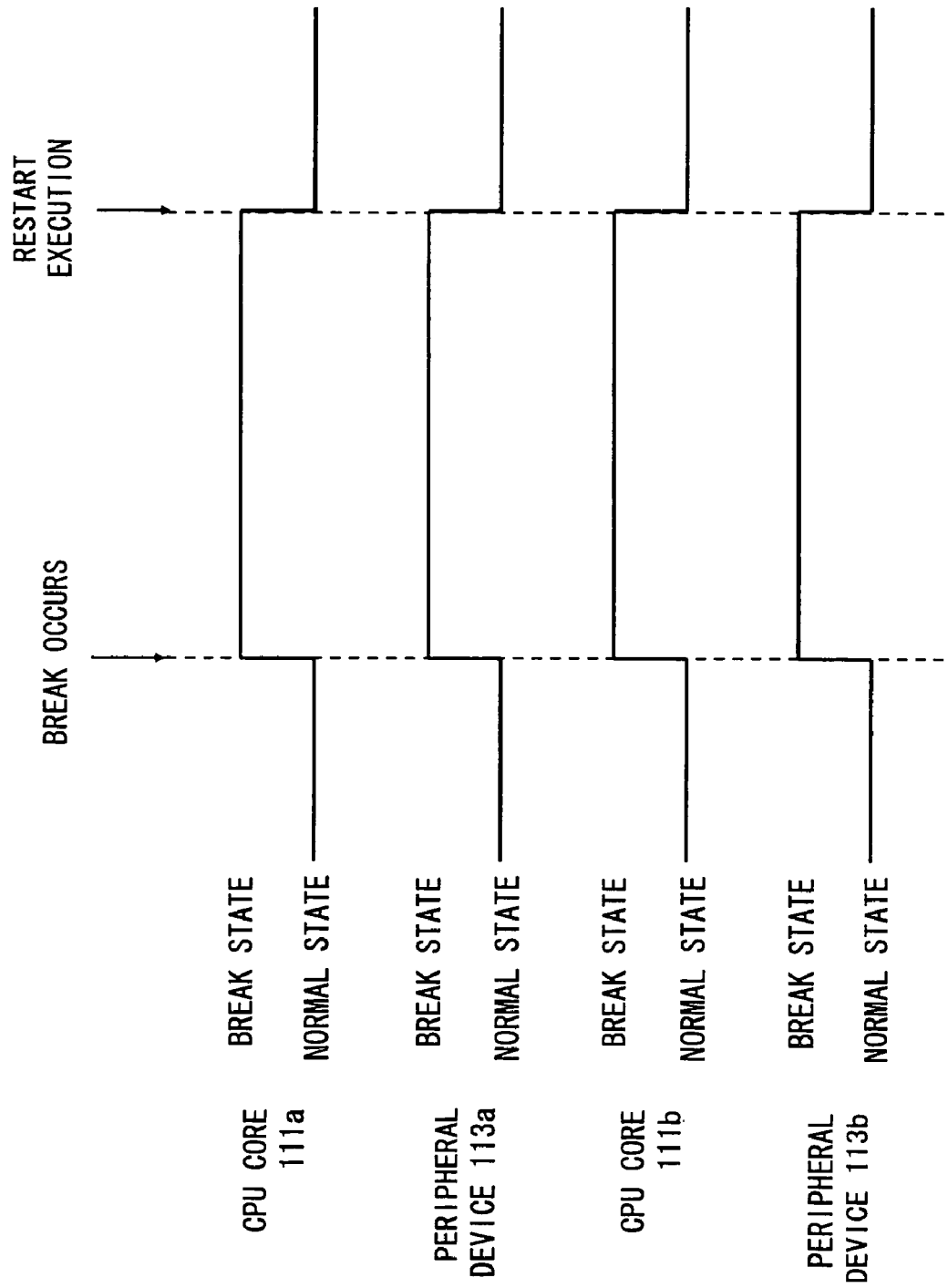
FIG. 7 is a timing chart of operations of the debugging system according to the present invention.

FIG. 7 is a timing chart of operations of the debugging system in the break mode. As shown in FIG. 7, when a break occurs in the CPU core 111*a*, for example, the CPU core 111*a* stops operations and switches the operational state from the normal state to the break state. Further, the peripheral device 113*a*, the CPU core 111*b*, and the peripheral device 113*b* stop operations at substantially the same timings to switch the operational state from the normal state to the break state. Further, receiving a request to restart execution from the debug PC 190, the CPU core 111*a*, the peripheral device 113*a*, the CPU core 111*b*, and the peripheral device 113*b* restart operations at substantially the same timings to switch the operational state from the break state to the normal state.

Figure 8:
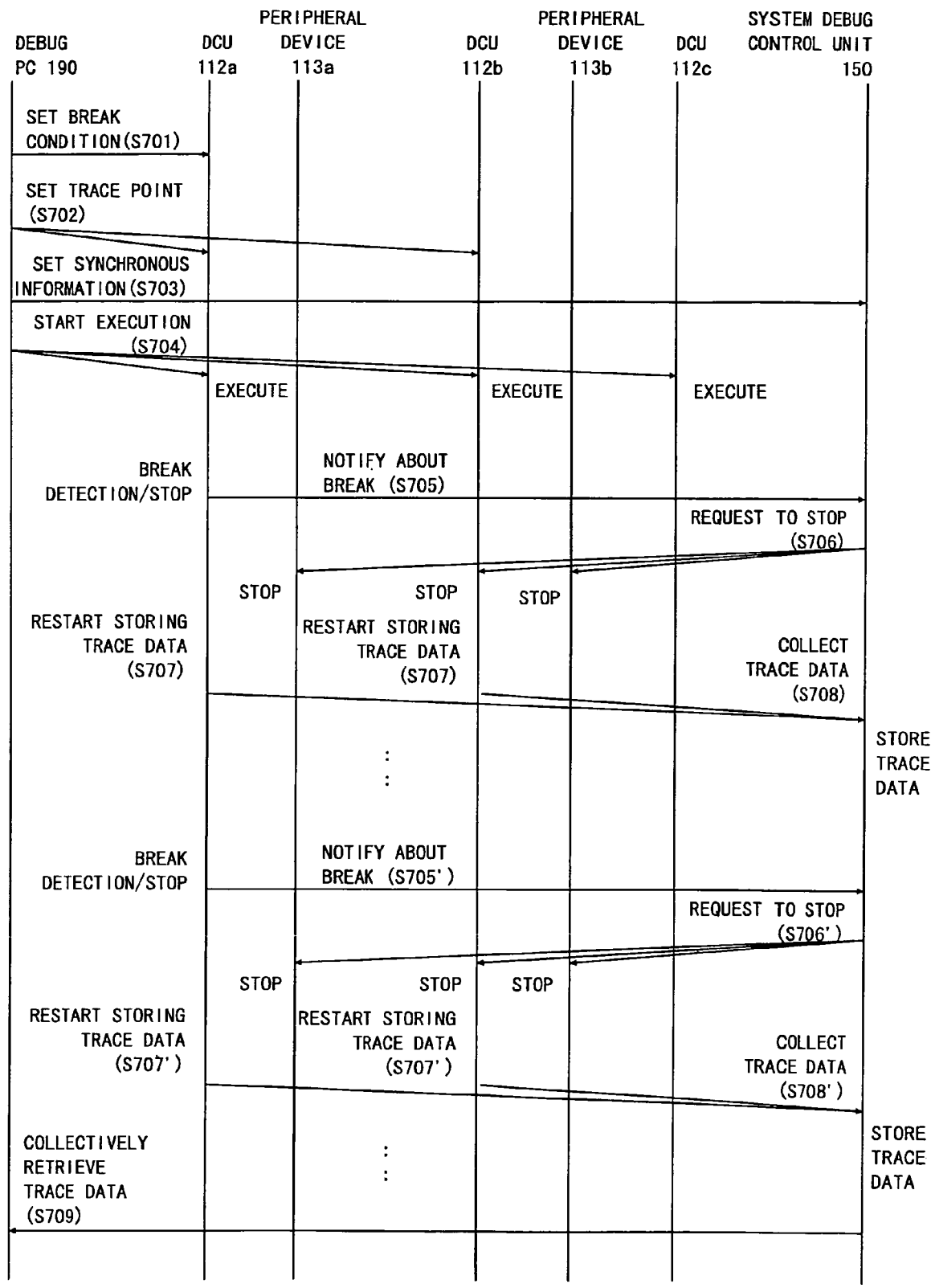
FIG. 8 is a sequence chart of the debugging system according to the present invention.

FIG. 8 shows operations of the debugging system in the on-the-fly trace mode. For example, after a user selects the on-the-fly trace mode with the debugger 191 of the debug PC 190, the following processing is carried out.

In the on-the-fly trace mode, first, the debug PC 190 sets a break condition in the DCU selected by a user, for example, the DCU 112*a* through the debugging external bus 132 (S701). As a result, the break condition setting unit 211 of the DCU 112*a* sets a break condition in the CPU core 111*a* in accordance with the request.

Next, the debug PC 190 issues a request to set a trace point to the DCUs 112*a* and 112*b* through the debugging external bus 132, (S702). As a result, the trace point setting unit 221 of the DCUs 112*a* and 112*b* sets a trace point in the CPU cores 112*a* and 111*b* in response to the request.

Next, the debug PC 190 sets break synchronization information about subsystems to be stopped in sync with each other when a break occurs, in the system debug control unit 150 through the debugging external bus 132 (S703). That is, the synchronization information storage unit 411 of the system debug control unit 150 stores synchronization information. For example, the information is set such that the peripheral device 113*a*, the DCU 112, and the peripheral device 113*b* are synchronized.

Next, the debug PC 190 issues a request to start executing a program to all DCUs, that is, the DCUs 112*a* to 112*c* through the debugging external bus 132 (S704). As a result, the DCUs 112*a* to 112*c* cause the CPU cores 111*a* to 111*c* to start executing a program.

Next, the break detecting unit 212 of the DCU 112*a* causes the CPU core 111*a* to stop executing the program (switch to the trace state) after detecting that the program execution satisfies the preset break condition, and notifies the system debug control unit 150 that the break occurs through the debugging synchronous bus 131 (S705).

Next, the system debug control unit 150 issues a request to stop execution to the subsystems to be stopped in sync with each other, in this example, the peripheral device 113*a*, the DCU 112, and the peripheral device 113*b* based on the preset break synchronization information through the debugging synchronous bus 131 (S706). That is, when receiving a notification that the break occurs, the break selecting unit 412 of the system debug control unit 150 references synchronization information in the synchronization information storage unit 411 to set a high level for a synchronous signal of the debugging synchronous bus 131 corresponding to the DCU 112 and the peripheral device 113 to be stopped. As a result, the suspending/restarting unit 213 of the DCU 112*b* causes the CPU core 111*b* to stop executing the program (switch to the trace state) in accordance with the synchronous signal. The suspending/restarting unit 310 of the peripheral devices 113*a* and 113*b* also stops circuit operations in accordance with the synchronous signal (switch to the trace state).

Next, the trace data collecting unit 222 of the DCUs 112*a* and 112*b* collects trace data at the preset trace point, and stores the data in the trace data holding unit 223 of the DCUs 112*a* and 112*b*, and then causes the CPU cores 111*a* and 111*b* to restart executing the program (switch to the normal state) (S707). At this time, the peripheral devices 113*a* and 113*b* also restart circuit operations (switch to the normal state). For example, the peripheral devices 113*a* and 113*b* restart operations after a predetermined period from when the circuit operation is stopped (predetermined clock).

Next, the trace data collecting unit 421 of the system debug control unit 150 collects the trace data stored in the DCUs 112*a* and 112*b* through the debugging internal bus 133 (S708). When receiving a notification that the break occurs, the trace data collecting unit 421 collects trace data before the trace data stored in the DCU 112 is updated in S705, and stores the collected trace data in the trace data storage unit 422. The trace data collecting unit 421 collects the trace data during a period from when each DCU 112 completes the collection of trace data until the next break detection, for example, after a predetermined period (predetermined clock) from when the notification about the break is received from the DCU 112, or after detecting that the CPU core 111 restarts execution. Incidentally, it is possible to detect that the CPU core 111 restarts execution based on the synchronous signal of the debugging synchronous bus 131 similar to the notification about the break.

After that, each time the DCU 112*a* detects that a break occurs, a series of processings (the notification about the break to the storage of trace data) is repeated (S705' to S708').

Then, the debug PC 190 collectively downloads plural trace data stored in the trace data storage unit 422 of the system debug control unit 150 through the debugging external bus 132 (S709). At this time, for example, the debug PC 190 causes all DCUs (DCUs 112a to 112c) to stop executing the program and then retrieves trace data. In response to a request to output trace data from the debug PC 190, the trace data output unit 423 of the system debug control unit 150 collectively outputs plural trace data from the trace data storage unit 422 at a time.

Figure 9:
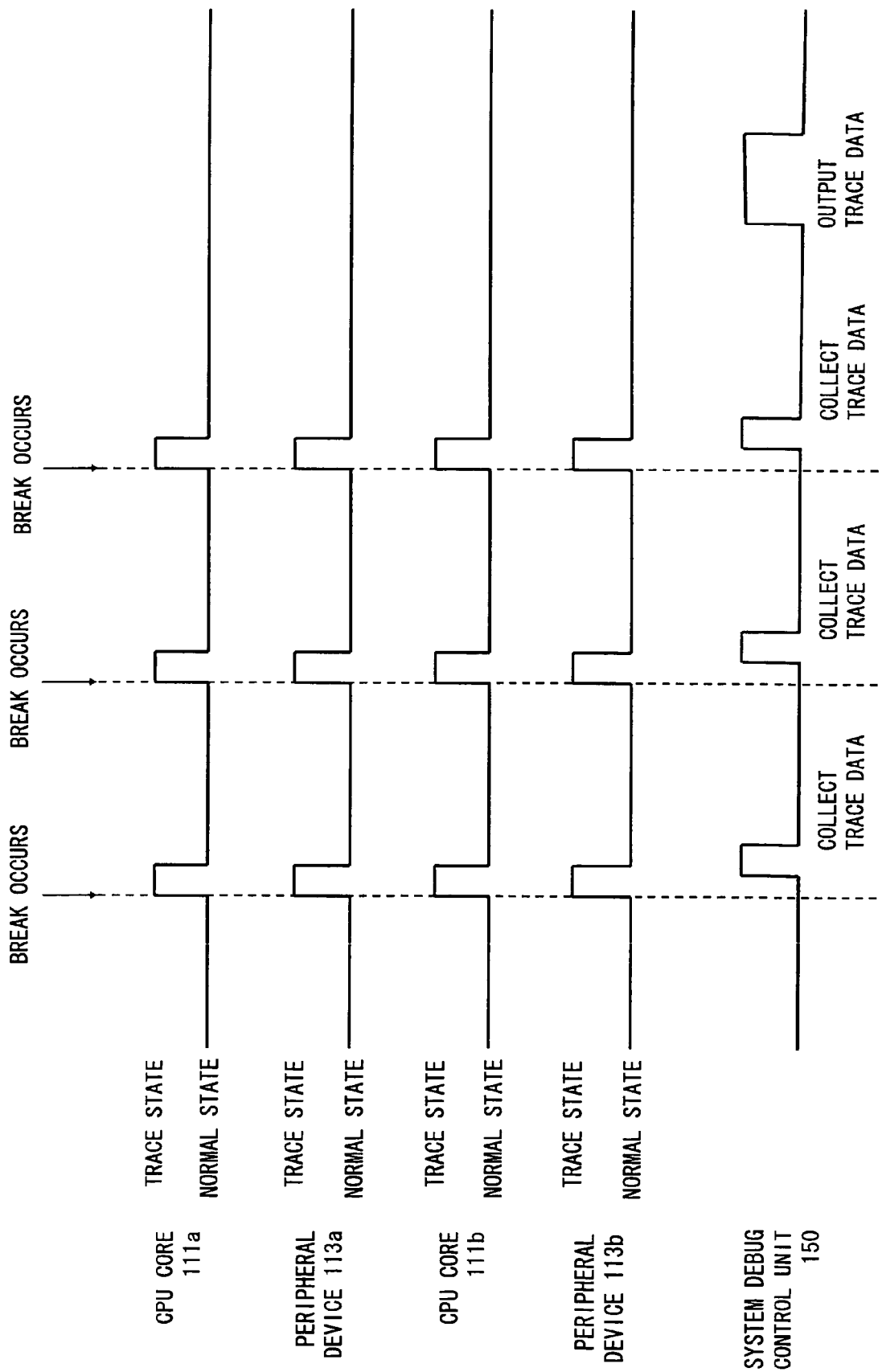
FIG. 9 is a timing chart of the debugging system according to the present invention.

FIG. 9 is a timing chart of operations of the debugging system in the on-the-fly trace mode. As shown in FIG. 9, for example, when a break occurs in the CPU core 111a, the CPU core 111a switches an operational state from the normal state to the trace state, and the peripheral device 113a, the CPU core 111b, and the peripheral device 113b also switch the operational state from the normal state to the trace state at substantially the same timings. Then, the CPU core 111a, the peripheral device 113a, the CPU core 111b, and the peripheral device 113b switch the operational state to the normal state at substantially the same timings, immediately after the trace data of the CPU cores 111a and 111b are collected. Further, the system debug control unit 150 collects the trace data from each DCU 112 at the predetermined timing, after the CPU core 111 is switched to the trace state. After collecting plural trace data, the system debug control unit 150 outputs the plural collected trace data.

As described above, in this embodiment, the debugging synchronous bus is connected with the peripheral device as well as the DCU, making it possible to stop the peripheral devices in sync with each other when a break occurs, in addition to the CPU cores. Therefore, it is possible to avoid a change in internal information when the break occurs, and to correctly collect the internal information when the break occurs.

Further, the system debug control unit is provided to select CPU cores or peripheral devices to be synchronized when the break occurs or the program execution is restarted, making it possible to stop/restart operations of only CPU cores or peripheral devices necessary for debugging, not stop/restart all CPU cores. Therefore, when a break occurs, internal information can be correctly obtained in accordance with the multiprocessor configuration.

Further, the system debug control unit is connected with each DCU through a high-speed internal bus, and trace data are collected and stored as needed. Further, plural trace data are output at a time through a low-speed external bus. Thus, even if the trace data stored in the DCU is updated, the trace data is not deleted immediately, so target trace data can be collected with reliability.

As a result, in this embodiment, it is possible to retrieve trace data or internal information of a CPU core selected by a user with accuracy to thereby debug the system with precision, and improve the debug efficiency.

Other Embodiments

Figure 10:
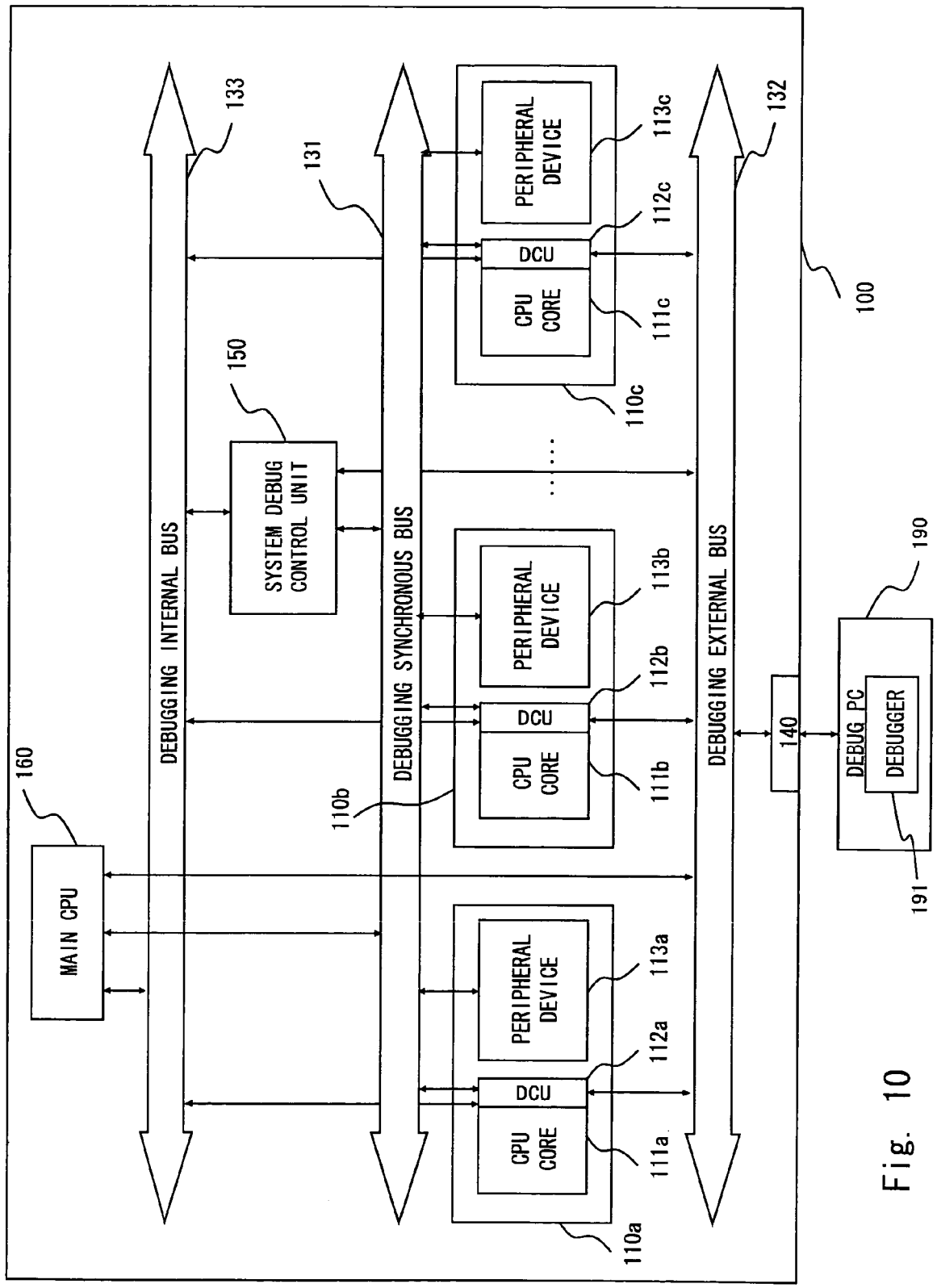
FIG. 10 is a diagram of the debugging system according to the present invention.

In the above embodiment, there is no particular limitation on a relation between processors of the debug-target LSI of multiprocessor configuration. For example, a tandem type multiprocessor where plural similar processors are operating in parallel or a master-slave type multiprocessor where plural processors are operating in a master-slave relationship. FIG. 10 shows an example where the present invention is applied to a master-slave type multiprocessor.

The system of FIG. 10 includes a main CPU 160 in the LSI 100 in addition to the components of FIG. 1. That is, the main CPU 160 is a master processor, and the CPU cores 111a to 111c are slave processors. The configuration of the main CPU 160 is the same as that of FIG. 2, and the main CPU 160 is connected with the debugging synchronous bus 131, the debugging external bus 132, and the debugging internal bus 133. Hence, regarding the main CPU as well, synchronization can be controlled when the break occurs or the execution is restarted by means of the system debug control unit 150 and the trace data can be collected with reliability.

Figure 11:
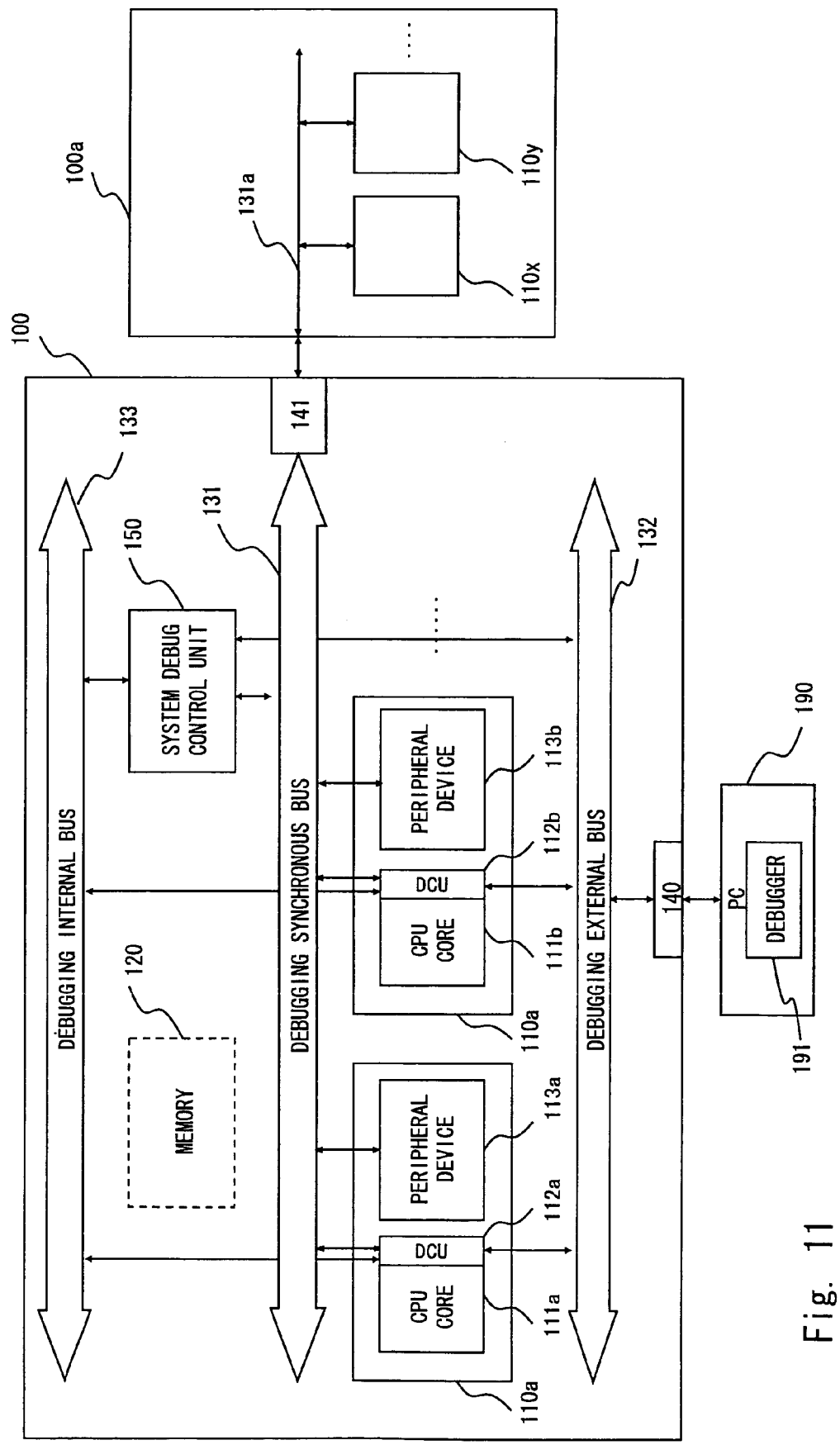
FIG. 11 is a diagram of the debugging system according to the present invention.
Figure 13:
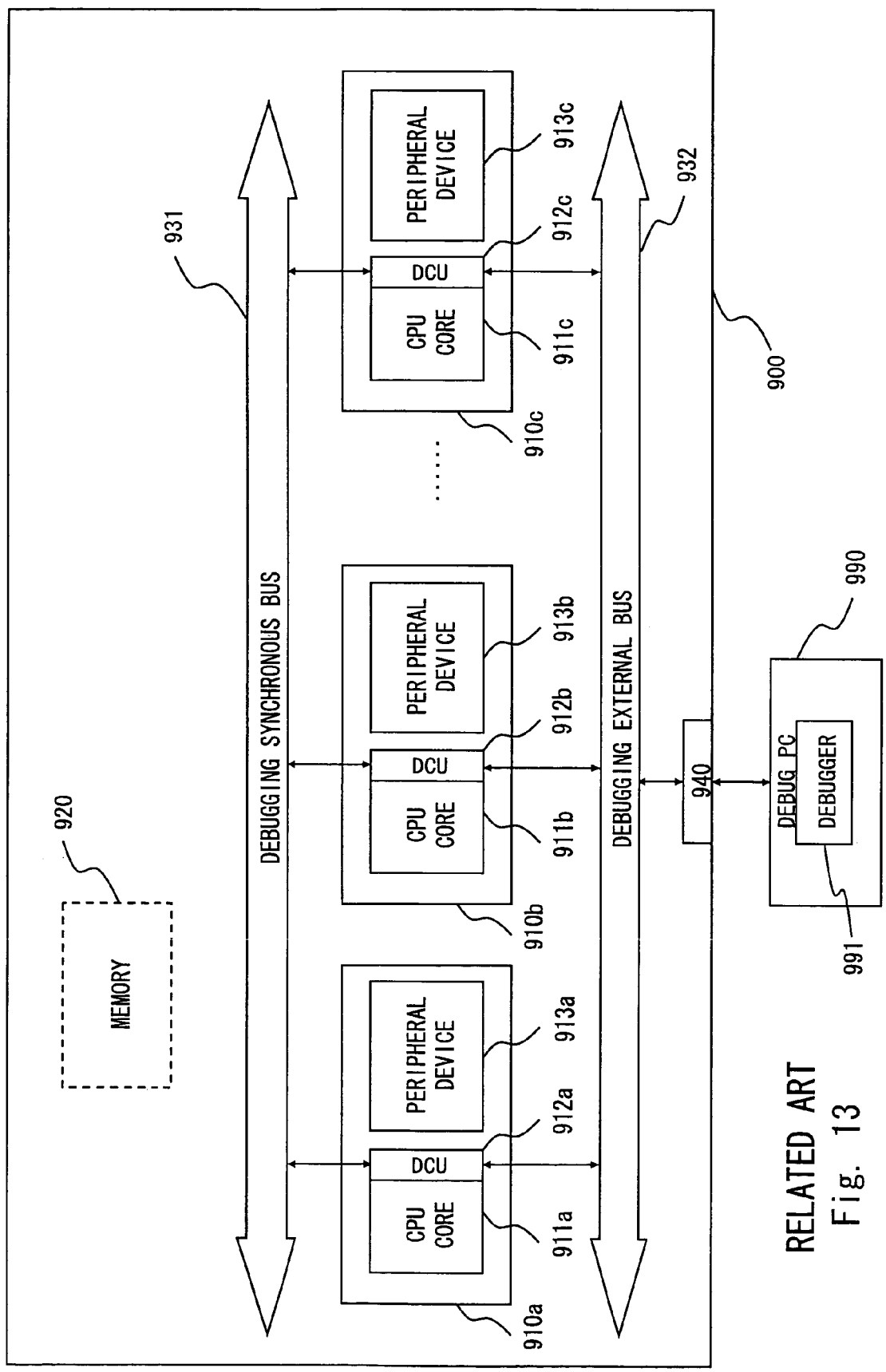
FIG. 13 is a diagram of a conventional debugging system.
Figure 14:
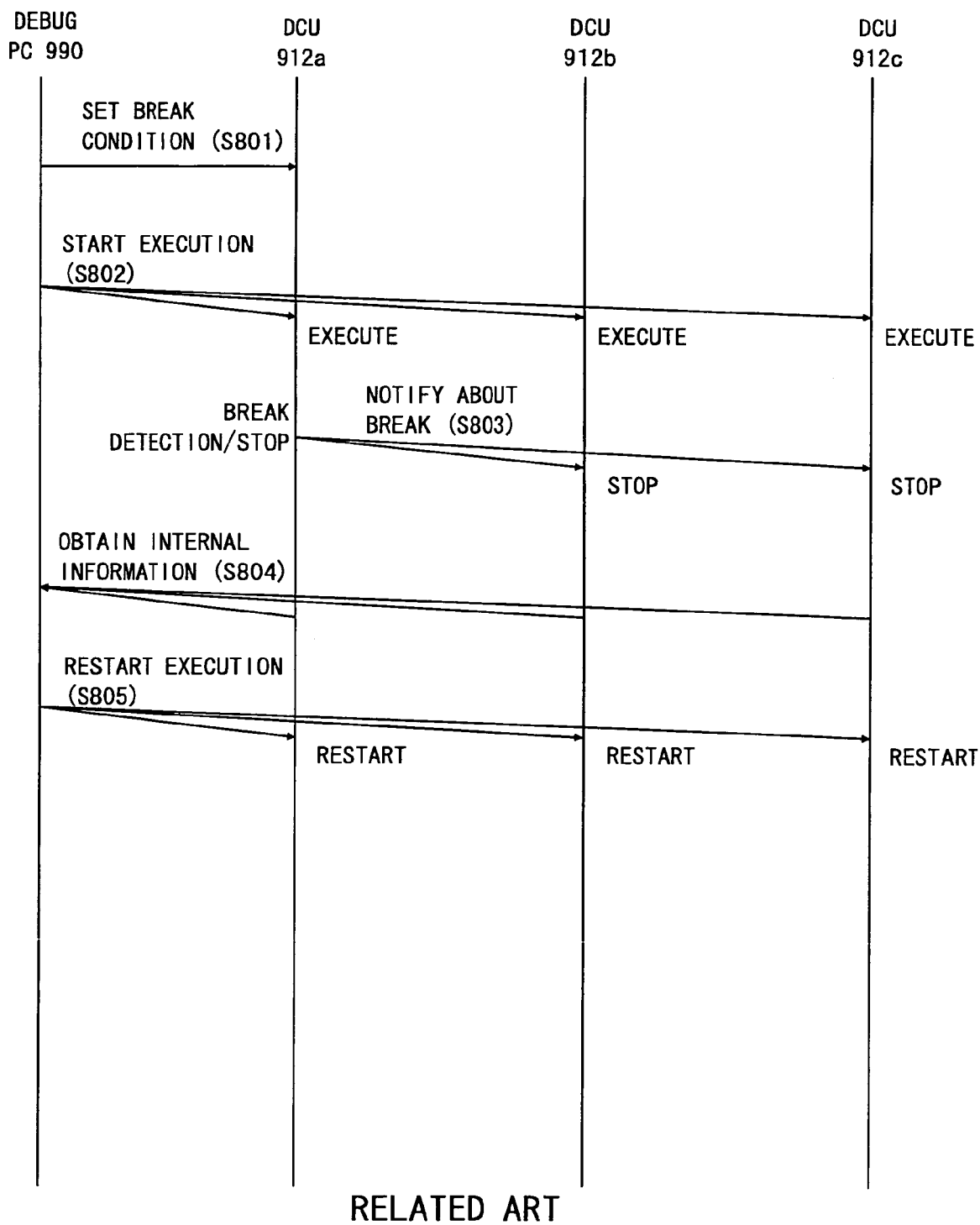
FIG. 14 is a sequence chart of operations of the conventional debugging system.
Figure 15:
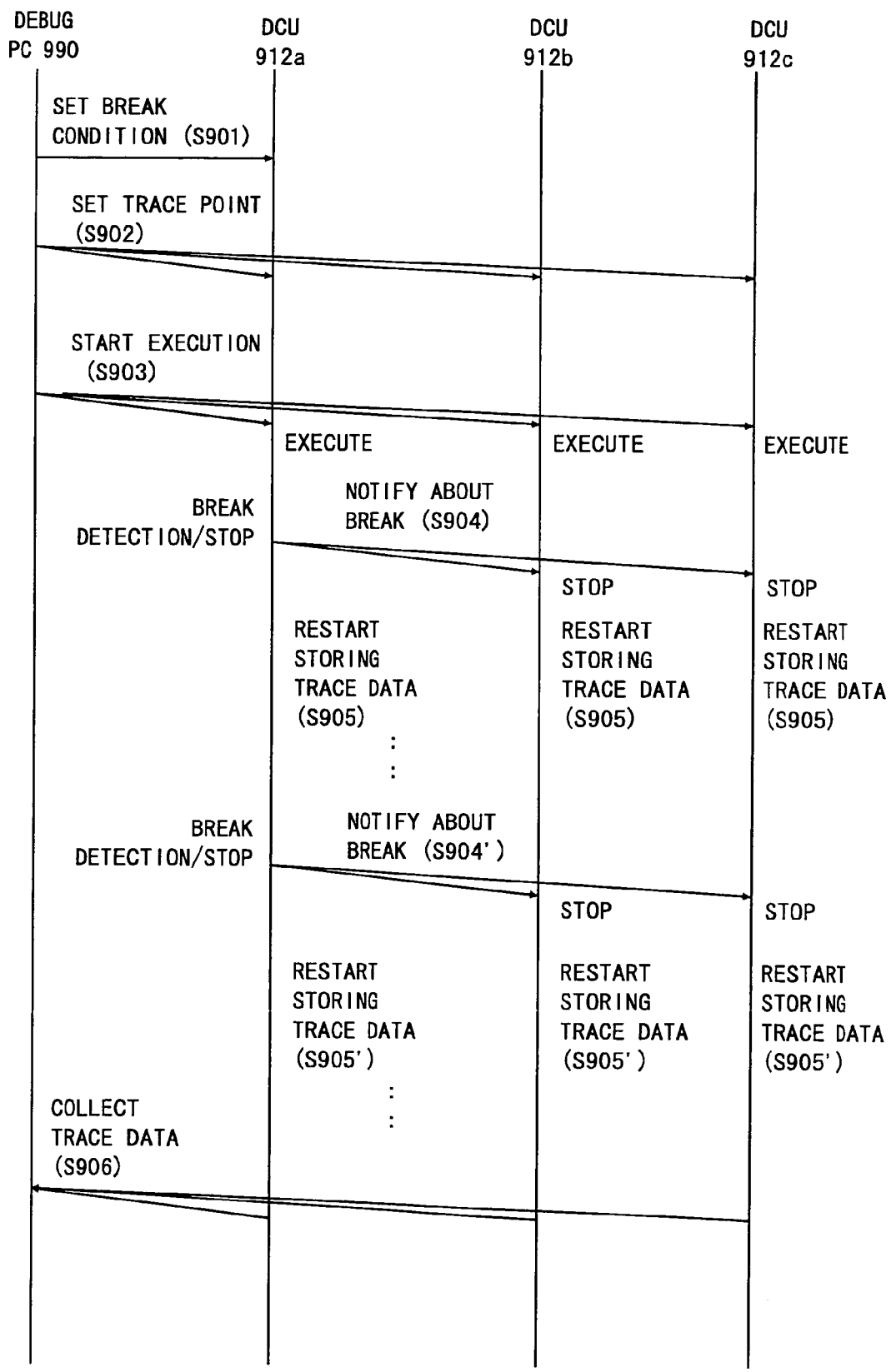
FIG. 15 is a sequence chart of operations of the conventional debugging system.

Further, as shown in FIG. 11, the LSI 100 may be provided with a debugging external synchronous I/F 141 connecting the debugging synchronous bus with the outside of the LSI. The bus is connected to a debugging synchronous bus 131a of another LSI (LSI 100a) through the debugging external synchronous I/F 141. The connected LSI 100a may be the LSI 100 of the present invention as shown in FIG. 1 or a conventional LSI 900 of FIG. 13. Thus, regarding a subsystem 110x or 110y provided in the LSI 100a as well, synchronization can be controlled when a break occurs or the execution is restarted.

Further, the system debug control unit 150 may have, as the debug mode, debug modes other than the break mode and the on-the-fly trace mode. For example, the unit may have a signal analysis mode for analyzing a level of a signal input to/output from the CPU core through a system bus. In the signal analysis mode, the system debug control unit 150 samples signals of the system bus connecting between the memory 120 and the CPU core 111 to store the sampling data in real time. Then, the debug PC displays a signal waveform based on the sampling data. This makes it possible to check a signal waveform of the bus as well as the internal state of the CPU core when a break occurs, so an error can be correctly analyzed and the debug efficiency can be further improved.

Further, in the above example, debugging is effected on the LSI of multiprocessor configuration, but may be effected on an LSI of single-processor configuration. For example, in the configuration of FIG. 1, only one of the subsystems 110a to 110c may be used. If a single subsystem is used, peripheral devices can be stopped in sync with each other when a break occurs, and the system debug control unit 150 can store plural trace data.

It is apparent that the present invention is not limited to the above embodiment that may be modified and changed without departing from the scope and spirit of the invention.

What is claimed is:

1. A semiconductor integrated circuit device, comprising:
a plurality of subsystems, a first one of said plurality of subsystems including a first processor, a second one of said plurality of subsystem including a second processor, and a third one of said first, second and third processors executing programs respectively in response to a first request;
a debug control unit that includes a break detecting unit, said debug control unit stopping program execution in said first processor when said break detecting unit detects that program execution in said first processor satisfies a predetermined break condition; and
a system debug control unit issuing a second request for stopping program execution in response to the detection result of said break detecting unit,
wherein said second processor stops program execution in response to said second request, and
wherein said third processor executes its program without responding to said second request when said second processor stops program execution in response to said second request.

2. The semiconductor integrated circuit device of claim 1, wherein said first one of said plurality of subsystem further including a first peripheral device supporting an operation of said first one of said plurality of subsystems under control of said first processor,
wherein said second one of said plurality of subsystems further includes a second peripheral device supporting an operation of said second one of said plurality of subsystems under control of said second processor, and wherein each of said first and second peripheral devices stops in response to said second request from said system debug control unit.

3. The semiconductor integrated circuit device according to claim 2, wherein said debug control unit and said first and second peripheral devices are commonly connected with a debugging synchronous bus.

4. The semiconductor integrated circuit device according to claim 2, wherein said system debug control unit restarts operation of said first and second processors and restarts said first and second peripheral devices.

5. The semiconductor integrated circuit device according to claim 1,
wherein said debug control unit further includes a trace data holding unit storing trace data collected from a predetermined trace pint, and
wherein said system debug control unit includes a trace data collecting unit collecting trace data from said trace data holding unit, a trace data storage unit storing the collected trace data, and a trace data output unit outputting the trace data stored in said trace data storage unit.

6. The semiconductor integrated circuit device according to claim 5,
wherein said debug control unit and said system debug control unit are commonly connected with a debugging internal bus, and
wherein a transfer speed of the debugging internal bus is higher that a transfer speed of an output interface of the trace data output unit.

7. The semiconductor integrated circuit device according to claim 5,
wherein a capacity of said trace data storage unit is larger than a capacity of said trace data holding unit.

8. The semiconductor integrated circuit device according to claim 1, further comprising a debugging synchronous bus and a debugging internal bus, wherein said system debug control unit is connected between said debugging synchronous bus, and said debugging internal bus, and
a debugging external bus whose speed is lower than both said debugging synchronous bus and said debugging internal bus, wherein said debug control unit is connected between said debugging synchronous bus and said debugging external bus,
wherein said debugging internal bus, said debugging external bus and said debugging synchronous bus are each separate from a system bus, 9. The semiconductor integrated circuit device according to claim 8,
wherein said first one of said plurality of subsystems further includes a first peripheral device supporting an operation of said first one of said plurality of subsystems under control of said first processor,
wherein said second one of said plurality of subsystems further includes a second peripheral device supporting an operation of said second one of said plurality of subsystems under control of said second processor, and
wherein said first and second peripheral devices are connected to said debugging synchronous bus.

10. a debugging method for debugging a semiconductor integrated circuit device that includes a plurality of subsystems, a first one of said plurality of subsystems including a first processor, a second one of said plurality of subsystems including a second processor, and a third one of said plurality of subsystems including a third processor, each of said first, second and third processors executing programs respectively in response to a first request, the method comprising:
in a debug control unit that includes a break detecting unit, stopping program execution in said first processor when said break detecting unit detects that program execution in said first processor satisfies a predetermined break condition; and
in a system, debug control unit, issuing a second request for stopping program execution in response to the detection result of said break detecting unit,
wherein said second processor stops program execution in response to said second request, and
wherein said third processor executes its program without responding to said second request when said second processor stops program execution in response to said second request.

11. The method according to claim 10,
wherein said first one of said plurality of subsystems further includes a first one of peripheral device supporting an operation of said first one of said plurality of subsystem under control of said first processor, and
wherein said second one of said plurality of subsystems further includes a second peripheral device supporting an operation of said second one of said plurality of subsystems under control of said second processor,
further comprising stopping each of said first and second peripheral devices in response to said second request from said system debug control unit.

12. The method according to claim 11, wherein said debug control unit and said first and second peripheral devices are commonly connected with a debugging synchronous bus.

13. The method according to claim 11, further comprising said system debug control unit restarting said first and said first and second processors and restarting said first and second peripheral devices.

14. The method according to claim 10,
further comprising, in a trace data holding unit in said debug control unit, storing trace data collecting from a predetermined trace point, and
in said system debug control unit,
a trace data collecting unit collecting trace data from said trace data holding unit, a trace data storage unit storing the collected trace data, and a trace data output unit outputting the trace data stored in said trace data storage unit.

15. The method according to claim 14,
wherein said debug control unit and said system debug control unit are commonly connected with a debugging internal bus, and
wherein a transfer speed of the debugging internal bus is higher than a transfer speed of an output interface of the trace data output unit.

16. The method according to claim 14,
wherein a capacity of said trace data storage unit is larger than a capacity of said trace data holding unit.

17. The method according to claim 10, further comprising a debugging synchronous bus and a debugging internal bus, wherein said system debug control unit is connected between said debugging synchronous bus and said debugging internal bus, and
a debugging external bus whose speed is lower than both said debugging synchronous bus and said debugging internal bus, wherein said debug control unit id connected between said debugging synchronous bus and said debugging external bus,
wherein said debugging internal bus, said debugging external bus and said debugging synchronous bus are each separate from a system bus.

18. The method according to claim 17,
wherein said first one of said plurality of subsystems further includes a first peripheral device supporting an operation of said first one of said plurality of subsystems under control of said first processor, wherein said second one of said plurality of subsystems further includes a second peripheral device supporting an operation of said second one of said plurality of subsystems under control of said second processor, and wherein said first and second peripheral devices are connected to said debugging synchronous bus.

* * * * *

UNITED STATES PATENT AND TRADEMARK OFFICE
CERTIFICATE OF CORRECTION

PATENT NO. : 7,636,870 B2
APPLICATION NO. : 11/586505
DATED : December 22, 2009
INVENTOR(S) : Shigeyuki Ueno It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Twenty-first Day of December, 2010

David J. Kappos
*Director of the United States Patent and Trademark Office*